United States Patent Office 3,256,494
Patented June 14, 1966

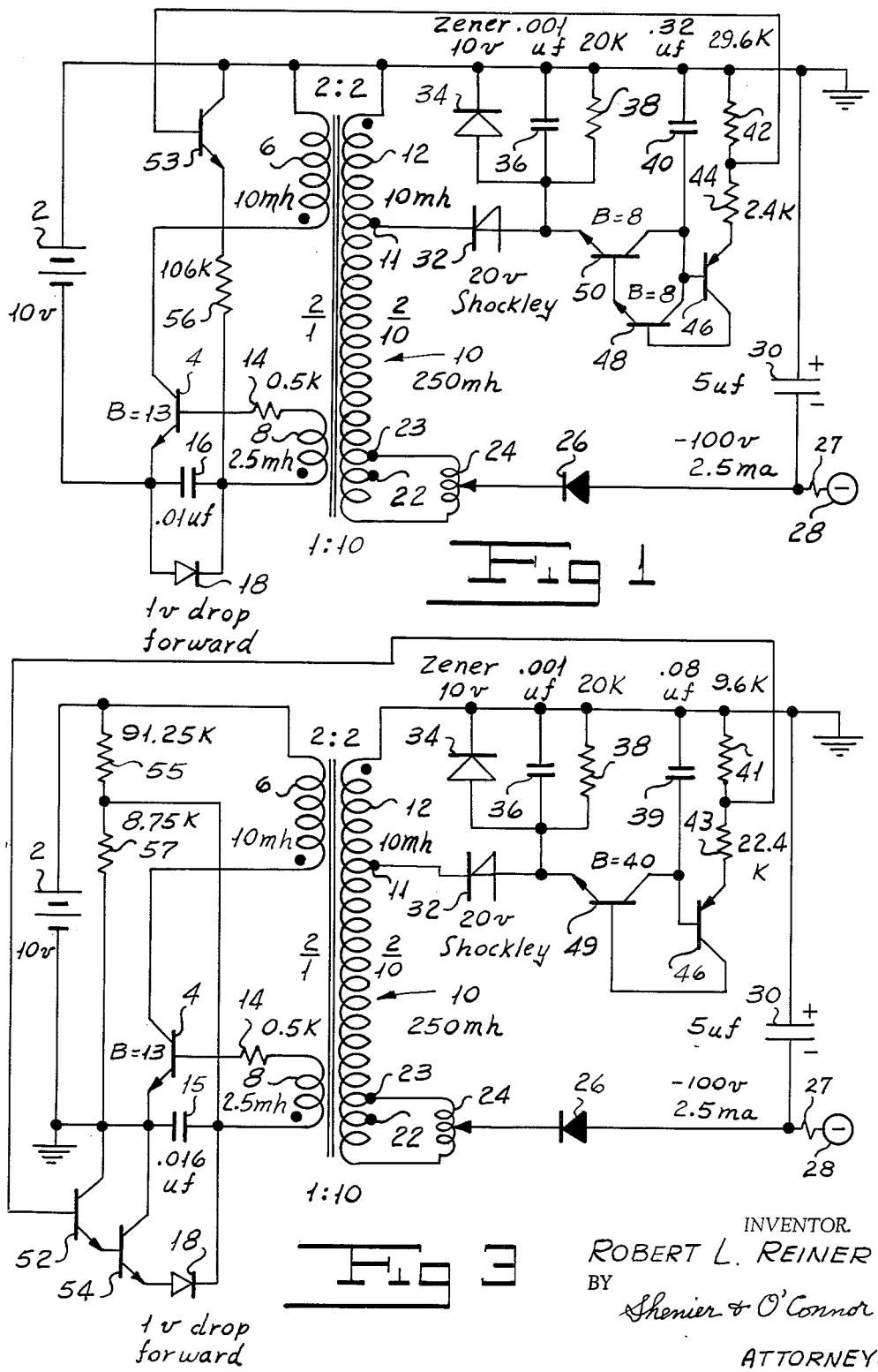

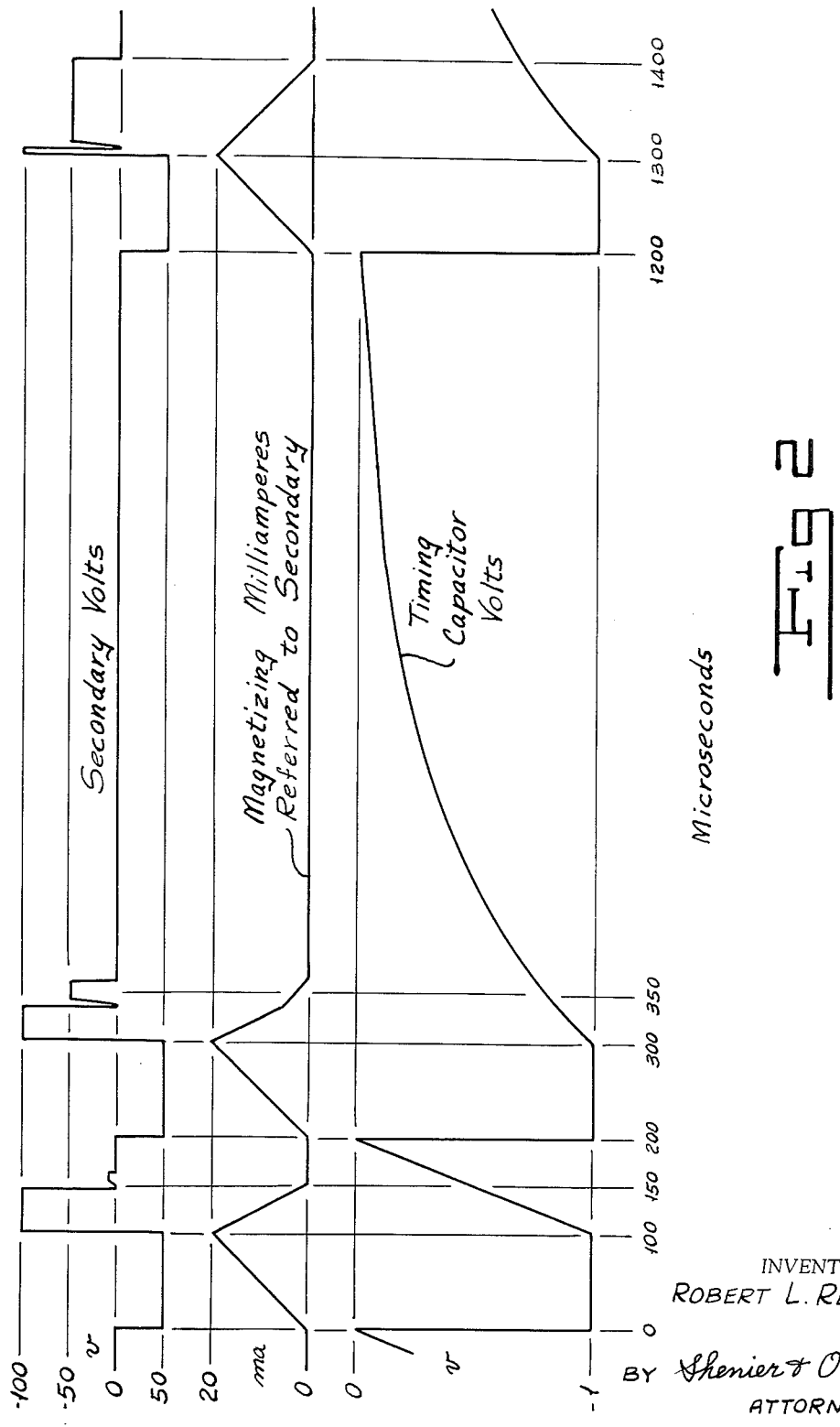

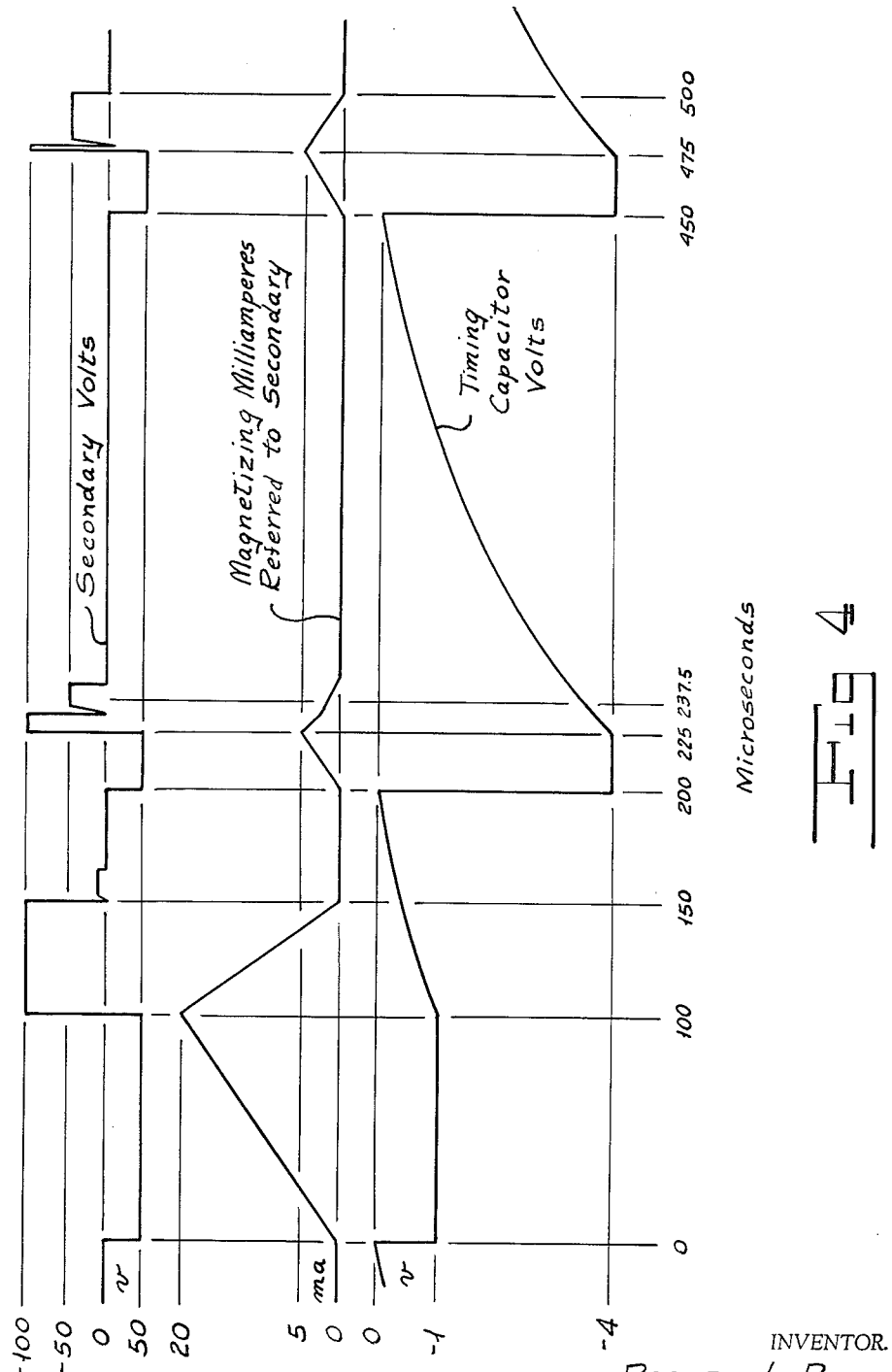

3,256,494
RELAXATION POWER SUPPLY WITH FEEDBACK
CONTROLLED POWER REGULATION
Robert L. Reiner, West Caldwell, N.J.
Filed Mar. 25, 1963, Ser. No. 267,477
22 Claims. (Cl. 331—112)

My invention relates to relaxation power supplies and more particularly to power supplies of good regulation and high efficiency.

In some power supplies of the prior art good regulation is achieved by employing some dissipative voltage reference device as a Zener diode or a gas tube in the direct-current output circuit. However, in such supplies maximum power is always dissipated whether by the voltage regulating device alone at no load or by the load itself at full load. Such power supplies are especially inefficient at no load.

In other battery and vibrator power supplies of the prior art high efficiency is secured by measuring the direct-current output voltage. If such voltage exceeds rated voltage then the battery and vibrator circuit is interrupted. However, the regulation for such supplies is inherently poor since energy occurs in bursts of an indeterminate number of pulses. Energy pulses can not be individually controlled, because only the gross direct-current voltage is measured; and there are always inherent time delays in the control circuit.

One object of my invention is to provide a relaxation power supply of high efficiency.

Another object of my invention is to provide a relaxation power supply of good regulation.

Still another object of my invention is to provide a relaxation power supply in which high efficiency is achieved by controlling the mark-space ratio, the ratio of "on" time to "off" time, of a relaxation oscillator.

A further object of my invention is to provide a relaxation power supply in which good regulation is achieved by controlling not only the energy of each individual pulse but also the energy of a fractional portion of a single pulse.

Other and further objects of my invention will appear from the following description.

In general my invention contemplates the provision of a free-running relaxation pulse generator the output pulses of which are rectified and filtered to provide the desired direct-current output. I regulate the direct-current output by measuring not the output itself but instead the amplitude of the pulses. This measurement is performed by some voltage reference device which is adapted to dissipate the entire energy of an output pulse. The energy dissipated in the voltage reference device is used to decrease the ratio of "on" time to "off" time of the pulse generator. In one embodiment of my invention, the decrease in mark-space ratio is achieved by permitting the mark or "on" time to remain constant while increasing the space or "off" time. In the first embodiment this results in a reduction in the frequency of pulses of constant energy. In a second embodiment of my invention, the power output of the pulse generator is decreased in response to the energy dissipated in the voltage reference device by decreasing the mark or "on" time and increasing the space or "off" time so that not only is the frequency of the pulse generator reduced but also each pulse is of reduced energy content.

In the accompanying drawings which form part of the instant specification and which are to be read in conjunction therewith and in which like reference numerals are used to indicate like parts in the various views:

FIGURE 1 is a schematic view of the first embodiment of my invention in which the energy of each pulse remains constant but the frequency of pulses is reduced.

FIGURE 2 is a graph of the time variation of various voltages and currents of the circuit of FIGURE 1.

FIGURE 3 is a schematic view of the second embodiment of my invention in which the frequency of pulses is reduced and in which the energy content of each pulse is diminished.

FIGURE 4 is a graph of the time variation of various voltages and currents of the circuit of FIGURE 3.

Referring more particularly now to FIGURE 1, the positive terminal of a 10 volt battery 2 is grounded. The collector of an n-p-n transistor 4 having a current gain B of 13 is connected through a 10 millihenry transformer primary winding 6 to ground. The negative terminal of battery 2 is connected to the emitter of transistor 4 and to one plate of a .01 microfarad capacitor 16. The other plate of capacitor 16 is serially connected through firstly a 2.5 mh. tertiary transformer winding 8 and secondly a 500 ohm resistor 14 to the base of transistor 4. The emitter of transistor 4 is connected to the anode of a silicon diode 18 which shunts capacitor 16. Diode 18 should have a 1 volt forward drop; that is, at a forward voltage of 1 volt the incremental resistance is very low while for forward voltages less than 1 volt and for reverse voltages the incremental resistance is high and the current is substantially zero. If a 1 volt silicon diode is not commercially available, then two standard silicon diodes each of ½ volt forward drop may be connected in series. The turns ratio between primary winding 6 and tertiary winding 8 is two-to-one. One terminal of a secondary transformer winding indicated generally by the reference numeral 10 is grounded. Winding 10 may be provided with a tap 22 such that between tap 22 and ground the inductance is 250 mh. and the turns ratio relative to the tertiary winding 8 is ten-to-one. The other terminal of winding 10 provides a voltage slightly greater than that at tap 22, while at tap 23 appears a voltage slightly less than at tap 22. A variable auto-transformer 24 is connected between the second terminal of winding 10 and tap 23. The slider of variable auto-transformer 24 is connected backwardly through a rectifier 26 to a negative output terminal 28 and to the negative plate of a 5 μf. output capacitor 30, the positive plate of which is grounded. Winding 10 is provided with a tap 11 such that between tap 11 and ground a winding portion 12 has an inductance of 10 mh. and a two-to-two turns ratio relative to primary winding 6. Tap 11 is connected to the cathode or n terminal of a p-n-p-n four-layer Shockley diode 32 having a 20 volt breakdown. The anode or p terminal of the four-layer diode 32 is connected through a 20 kilohm resistor 38 to ground, through a .001 μf. capacitor 36 to ground, to the anode of a 10 volt Zener diode 34 the cathode of which is grounded, and to the emitter of an n-p-n transistor 50 having a current gain of 8. The collector of transistor 50 is connected to the base of a p-n-p transistor 46, to the collector of an n-p-n transistor 48 having a current gain of 8, and through a .32 μf. capacitor 40 to ground. The emitter of transistor 48 is connected to the base of transistor 50. The collector of transistor 46 is connected to the base of transistor 48. The emitter of transistor 46 is serially connected through firstly a 2.4K resistor 44 and secondly a 29.6K resistor 42 to ground. The junction of voltage dividing resistors 42 and 44 is connected to the base of an n-p-n transistor 53 the collector of which is grounded. The emitter of transistor 53 is connected through a 106K resistor 56 to the cathode of diode 18. The transformer windings are so polarized, as indicated by the markings, that when the ungrounded terminal of winding 6 is negative, that terminal of winding 8 connected to capacitor 16 is negative, and the grounded terminal of winding 10 is negative. At terminal 28 rated output is 2.5 milliamperes at −100 volts, which represents 250 milliwatts.

In operation of the circuit of FIGURE 1, and referring now to both FIGURES 1 and 2, slightly before zero microseconds time, transistor 4 is nonconductive. No voltage exists across any of the windings of the transformer, the voltage across capacitor 16 is negative, and the current through resistor 56 is charging capacitor 16 positively. At zero $\mu$sec. time, the voltage across capacitor 16 becomes zero permitting base current to flow to transistor 4. The regenerative action between primary winding 6 and tertiary feedback winding 8 forces transistor 4 "on," so that 10 volts appear across winding 6 and 5 volts appear across winding 8 and resistor 14. The initial base current flow through resistor 14 is 10 ma. This current flows through capacitor 16 causing a very rapid discharge to −1 volt, where current through diode 18 then prevents any further negative excursion. Across resistor 14 now appear 4 volts, which causes a base current of 8 ma. Due to the two-to-one turns ratio between windings 6 and 8, a primary current of 4 ma. in winding 6 is required to support 8 ma. in winding 8. However, such current in winding 6 does not constitute magnetizing current. Between 0 $\mu$sec. and 100 $\mu$sec., 10 v. across winding 6 produces 50 v. across secondary winding 10 by virtue of the five-to-one turns ratio between the windings. During this period the magnetizing current referred to the secondary builds up substantially linearly from 0 ma. to 20 ma. It will be appreciated that during this time the actual magnetizing current of the primary winding 6 is building up substantially linearly from 0 ma. to 100 ma. At 100 $\mu$sec., the current through winding 6 is 100 ma. magnetizing current and 4 ma. transformer current to support the 8 ma. current of winding 8. Since transistor 4 has a current gain of 13, a base current of 8 ma. will permit a collector current of 104 ma. Thus the collector current of transistor 4 reaches a value which the base current thereof is just sufficient to support. Accordingly an inductive kick is initiated as transistor 4 is turned "off," because of the regenerative action between the primary winding 6 and the tertiary winding 8 of the transformer. Assuming that the voltage across storage capacitor 30 is only slightly less than 100 v., the voltage of secondary winding 10 jumps from +50 v. to −100 v., where rectifier 26 begins conduction, and 20 ma. magnetizing current referred to the secondary now flows through the secondary. The discharge through rectifier 26 is at a voltage substantially twice that which existed during the charging period. Since the transformer voltage-time integral during flux build-up is equal to that during flux decay, the time period of decay will be only half that of build-up. Between 100 $\mu$sec. and 150 $\mu$sec. the magnetizing current drops substantially linearly from 20 ma. toward 0 ma. The magnitude of the capacitor 30 has been selected so that each pulse produces no more than 0.1 volt. With full load applied at terminal 28, substantially all the magnetic energy will be coupled to capacitor 30. However, a small residual energy will remain to be dissipated. Slightly before 150 $\mu$sec., that is, slightly before the secondary current drops to zero, at 149 $\mu$sec. for example, capacitor 30 will be charged to −100 volts, and −20 volts will appear at tap 11. Resistor 38 causes the anode of four-layer diode 32 to be at ground potential. Accordingly diode 32 breaks down and conducts with substantially no voltage drop. The secondary voltage then decreases from −100 v. to 0 v.; and the residual current through the secondary winding now flows through tap 11 and diode 32 rapidly charging capacitor 36 to some small negative voltage which we shall assume previously existed across capacitor 40. When the emitter of transistor 50 becomes more negative than its collector the residual magnetizing energy is dissipated at substantially constant voltage in charging capacitor 40 through transistors 48 and 50. It will be subsequently shown that the time period of the charging of capacitor 40 is 11 $\mu$sec. Accordingly at 160 $\mu$sec. all of the inductive energy having been dissipated, the voltage of all windings drops to zero. Since the voltage across capacitor 40 is very low, the base and hence the emitter of emitter follower 53 are substantially at ground potential. At 100 $\mu$sec., current through resistor 56 exponentially charges capacitor 16 from −1 v. toward +10 v. At 200 $\mu$sec. the voltage across capacitor 16 reaches zero, causing transistor 4 to be turned on commencing a new cycle.

The time period between 0 and 200 $\mu$sec. represents the operation of the circuit for one complete cycle at full load. Thus the frequency is 5 kilocycles. Between 200 $\mu$sec. and 300 $\mu$sec., 50 volts appear across the secondary winding 10 corresponding to the 10 volts across winding 6; and the magnetizing current rises linearly from 0 ma. to 20 ma., when referred to the secondary winding 10, or from 0 to 100 ma. when referred to the primary winding 6. At 300 $\mu$sec., when transistor 4 reaches saturation, an inductive kick again occurs causing the voltage across secondary winding 10 to become −100, whereupon current flows through rectifier 26. Assume now that the voltage across capacitor 40 is substantially 10 volts and the load connected at terminal 28 is only 3/16 or 18.75% of rated load. The secondary magnetizing current, between 300 and 350 $\mu$sec., decreases linearly from 20 ma. toward 0 ma. However, when the secondary current drops to 5 ma. at 337.5 $\mu$sec. the voltage across capacitor 30 reaches −100 v., and the voltage at tap 11 reaches −20 volts. Shockley diode 32 breaks down reducing the secondary voltage to zero. The initial current at tap 11 is five times that flowing through rectifier 26 at the instant of breakdown. Accordingly the initial current is 25 ma. which rapidly charges capacitor 36 to substantially −10 volts whereupon current flows through capacitor 40 and transistors 50 and 48. With −10 volts at tap 11, −50 volts appear across the secondary winding 10. The discharge through capacitor 40 is at substantially constant voltage and occurs for a period of 25 $\mu$sec. Accordingly at 362.5 $\mu$sec. the residual magnetic energy is exhausted and the voltage of all windings drops to zero. It will be noted that during the charging of capacitor 40 the rate of change of magnetizing current referred to the secondary is only half that for the discharge through rectifier 26. With −10 volts across capacitor 40, the potential at the junction of voltage dividing resistors 42 and 44 is −9.25 volts. At 300 $\mu$sec., current through resistor 56 exponentially charges capacitor 16 from −1 v. toward 0.75 v. However at 1200 $\mu$sec., the voltage across capacitor 16 becomes zero, triggering transistor 4 on, and beginning a new cycle. If −10 v. exist across capacitor 40 then the period is from 200 to 1200 $\mu$sec. or 1000 $\mu$sec. which represents a frequency of 1 kilocycle.

Between 1200 and 1300 $\mu$sec., 10 volts appear across winding 6 while 50 volts appear across winding 10; and the magnetizing current referred to the secondary winding changes linearly from 0 to 20 ma. while the magnetizing component of primary current increases linearly from 0 to 100 ma. Assume now that substantially no load is connected at 1300 $\mu$sec. An inductive kick occurs as transistor 4 is turned off, the secondary voltage jumps to −100 producing −20 volts at tap 11, breaking down four-layer diode 32. The secondary voltage immediately drops to zero, and the magnetizing current very rapidly charges capacitor 36 to the same voltage as capacitor 40. Assuming that this voltage is slightly less than −10 volts, the currents through transistors 48 and 50 charge capacitor 40 to −10 volts, whereupon Zener diode 34 breaks down. This sequence of events takes place in a few microseconds. Consequently between substantially 1300 and 1400 $\mu$sec., the magnetizing energy is dissipated in Zener diode 34 at a level of −10 volts producing a constant voltage of −50 across secondary winding 10.

It will be seen then that at full load the frequency is high, 5 kilocycles; and most of the energy of each pulse is coupled to capacitor 30 while very little is directed to capacitor 40 which is subsequently dissipated in resistors 42 and 44. At 18.75% load, the frequency is reduced by a factor of five, to one kilocycle, which means that the power output is reduced to 20% of that at rated load. Of this 20% power output, 18.75% is coupled to capacitor 30 where it is subsequently dissipated by the load; and 1.25% is coupled to capacitor 40 where it is subsequently dissipated by resistors 42 and 44. At no load the power output remains constant at 20%. Of this 1.25% is still dissipated in resistors 42 and 44 and the remaining 18.75% is now dissipated by the Zener diode 34.

Let us now turn to the timing circuitry. At no load the initial voltage across resistor 56 at 100 μsec. is 11 volts while at 200 μsec. the voltage is 10 volts. Thus $$\frac{10}{11} = .91 = e^{.095}$$

This means that 100 microseconds represent .095 of the time constant of resistor 56 and capacitor 16. At loads of 18.75% or less, the initial voltage across resistor 56 at 300 μsec. is 1.75 volts while at 1200 μsec. the voltage is 0.75 volt. Thus $$\frac{0.75}{1.75} = .428 = e^{.85}$$

This means that 900 μsec. represents .85 of the time constant of resistor 56 and capacitor 16. It will further be noted that $$\frac{.85}{.095} = 9$$

which corresponds to the fact that 900 microseconds is nine times as long a period as 100 microseconds. The time constant of resistor 56 and capacitor 16 is therefore $$\frac{900}{.85} = \frac{100}{.095} = 1060 \ \mu sec.$$

It will be noted that at the instant of triggering on of transistor 4, the current through capacitor 16 varies between 10 ma. initially and 8 ma. finally with an average current of about 9 ma. so that the rate of change of voltage across capacitor 16 is 0.9 volt per microsecond. This time interval is so small that the changes of voltage across capacitor 16 from 0 volt to −1 volt are shown as vertical lines.

The current through inductor 6 changes at a rate of 100 ma. in 100 μsec. for 10 volts applied. This requires an inductance of 10 mh.

Each output pulse to capacitor 30 consists of a current decreasing linearly from 20 ma. to 0 ma. in 50 microseconds which represents an average current for this 50 interval of 10 ma. with a consequent charge transfer of 0.5 microcoulomb. In order that each pulse change the voltage across capacitor 30 by not more than 0.1 volt its capacitance value must be 5 μf.

Resistor 38 and capacitor 36 act as a buffer idling circuit so that a constant voltage may appear across capacitor 40 while at the same time ensuring that the potential at the anode of the four-layer diode 32 is substantially ground when breakdown occurs. The time interval between the end of the discharge through the four-layer diode 32 on one cycle and the subsequent breakdown of diode 32 on the next cycle may be somewhat less than 180 microseconds. It is desired that during this period capacitor 36 discharge substantially to ground potential. By causing the time-constant of resistor 38 and capacitor 36 to be 20 μsec., which is approximately ⅑ of 180 μsec., the error will be only $e^{-9} = .01\%$ of 10 volts or 1 millivolt. The circuit comprising resistor 38 and capacitor 36 dissipates negligible power since it is only operated in pulses and the voltage across capacitor 36 is maintained for only a fractional portion of a cycle. Resistor 38 may have a rather large value. However this value should be negligible compared with the back resistance of the emitter-base junction of transistor 50 so that leakage current through the back resistance of such emitter-base junction does not adversely disturb the return of the emitter of transistor 50 to ground potential. It will be appreciated that if the back resistance of the emitter-base junction of transistor 50 is not sufficiently high, then a conventional blocking diode may be inserted with its anode connected to the emitter of transistor 50.

When the four-layer diode 32 is nonconductive, current from resistors 42 and 44 through the emitter-base diode of transistor 46 discharges capacitor 40. In steady state operation with an 18.75% load, so that the voltage across capacitor 40 is −10 volts, the current pulses of capacitor 40 decrease linearly from 25 ma. to 0 ma. in 25 μsec. which represents an average current of 12.5 ma. for the period and a consequent charge of .31 microcoulomb. Since the frequency is 1 kilocycle this represents a current of .31 ma. The average current of the pulses flowing out of the capacitor 40 through transistors 48 and 50 must equal the average current flowing into capacitor 40 through resistors 42 and 44. Accordingly the sum of resistors 42 and 44 should have a value of 32K in order that 10 volts produce a current of .31 ma.

Capacitor 40 may have a value sufficiently large so that the decay of voltage is not more than 10% per cycle; and correspondingly that the change in voltage produced by current pulses through four-layer diode 32 likewise do not produce a change of more than 10% per cycle. Thus for an 18.75% load, capacitor 40 will be rapidly charged from −9 to −10 volts and then decay slowly from −10 to −9 volts, where another rapid charging period is initiated. In order that .31 microcoulomb produce a change of only 1 volt, capacitor 40 should have a value of .32 μf.

It will be appreciated that FIGURE 2 does not truly represent a curve of actual operation, since the voltage across capacitor 40 should not in one cycle jump from substantially 0 volt as indicated at 100 μsec. to −10 volts as indicated at 300 μsec.

It is the purpose of capacitor 40 to introduce smoothing in the control of the mark-space ratio of the relaxation oscillator. With the load at 18.75% the residual energy of 1.25% to capacitor 40 and thence resistors 42 and 44 maintains the frequency of the regulator at minimum value. If the load were increased to 20% and insufficient smoothing were provided by capacitor 40, then a subsequent energy pulse would be entirely absorbed by the load and provide no energy to capacitor 40, since diode 32 would not break down. The excessively rapid decay of voltage across capacitor 40 would cause the regulator to revert to high frequency operation so that the subsequent pulse would rapidly follow. Substantially all the energy of this pulse would be wasted in Zener diode 34 and in resistors 42 and 44 as the control voltage jumps from 0 back to −10 volts. Thus with insufficient smoothing from capacitor 40, the control voltage will be alternately too great and then too small. This means that energy is saved on one cycle but on the succeeding cycle substantially all the energy is wasted. Such mode of operation would, of course, improve the efficiency of the circuit by a factor of two over circuits of the prior art but would fail to achieve the design improvement in efficiency of my circuit, which should be a factor of five over circuits of the prior art. The difficulty arises because for steady state operation for loads of 18.75% or greater only 1.25% or less of rated output is wasted in resistors 42 and 44. Consequently an increase in load of as little as 1.25% or less would cause a complete loss of charging current to capacitor 40. The dilemma is as follows: If resistors 42 and 44 dissipate a small amount of power, then capacitor 40 must introduce a large amount of smoothing; if, however, the control power loss in resistors 42 and 44 is increased, then the smoothing produced by capacitor 40 may be reduced. It is desirable for fast speed of response that capacitor 40 be reduced to such value that one or two overshoots of the steady-state voltage across the capacitor will be made. Obviously the smaller the power dissipated in resistors 42 and 44, the greater will be the efficiency of the circuit, but the less will be its speed of response to transient changes in load.

It will be appreciated that if the current through diode 32 upon each breakdown thereof is less than that required to maintain the existing voltage across capacitor 40 then the voltage increase during each pulse will be less than the voltage decrease across capacitor 40 during the period between pulses. Accordingly the voltage across capacitor 40 will gradually decay toward zero, thereby increasing the frequency of pulses until an equilibrium is reached. In the limiting condition of no energy pulses to capacitor 40 through diode 32, the rate of voltage decay of capacitor 40 will be larger. This maximum rate of discharge is fixed by resistors 42 and 44.

Where the pulses to capacitor 40 through diode 32 are more than sufficient to maintain the voltage across the capacitor, then the voltage thereof will increase. Transistors 46, 48, and 50 are provided to control the rate of increase of voltage across capacitor 40. It will be appreciated that I may eliminate such three transistors, so that resistors 42 and 44 shunt capacitor 40, and provide a blocking diode between with its anode connected to capacitor 40 and its cathode connected to the anode of four-layer diode 32. In such event there would be no control of the charging current of capacitor 40. Upon a sudden reduction in load, sufficient inductive energy may be present in the transformer to charge capacitor 40 in one cycle from 0 volt to —10 volts. This would certainly produce a large overshoot in achieving a steady-state voltage across capacitor 40 for a constant load at terminal 28. Transistors 46, 48 and 50 limit the charging current to capacitor 40 to a value proportional to the discharge current through resistors 42 and 44. With an 18.75% load at terminal 28, the initial current through diode 32 to capacitor 40 is 25 ma.; and with —10 volts across capacitor 40, the emitter current of transistor 46 is .31 ma. When four-layer diode 32 breaks down, this emitter current of transistor 46, rather than flowing to capacitor 40, flows instead through the collector of transistor 46 to the base of transistor 48 and produces a collector current in transistor 48 of .31×8=2.5 ma. The total emitter current of transistor 48 is thus 2.5+.31=2.8 ma., which likewise constitutes the base current of transistor 50. The collector current of transistor 50 is 2.8×8=22.5 ma. Thus the current through capacitor 40 comprises the 2.5 ma. collector current of transistor 48 in addition to the 22.5 ma. collector current of transistor 50, producing a total current of 25 ma. It will be seen that if the voltage across capacitor 40 is —1 volt instead of —10 volts, the charging current to capacitor 40 through transistors 48 and 50 will be correspondingly limited to 1/10 of 25 ma. or 2.5 ma. If at the instant of breakdown of diode 32, the current through diode 32 is 50 ma. or even 100 ma., the curernt through capacitor 40 will still be limited to 2.5 ma. The voltage at the emitter of transistor 40 will decrease to —10 volts where the residual current is passed by the breakdown of Zener diode 34. Transistor 46 operates as a constant current source so that the base current of transistor 48 is proportional to the voltage across capacitor 40 irrespective of the voltage drop across transistors 50 and 48. It will be appreciated that if transistor 46 were omitted and resistor 44 connected directly to the base of transistor 48, then the current flow through capacitor 40 would no longer be limited to a value proportional to its voltage but would instead, upon breakdown of Zener diode 34, be limited to the maximum value of 25 ma.

Auto-transformer 24 is provided for slight adjustment of output voltage to compensate for variations in the breakdown voltage of diode 32 or for erroneous positioning of the tap 11, so that the output voltage at terminal 28 may be made precisely equal to —100 volts. The regulation from 100% load to 20% load is excellent and substantially independent of the forward resistance of rectifier 26, since, when diode 32 breaks down, the current through rectifier 26 is very small and its voltage drop correspondingly small. Thus for 80 ohms forward resistance of rectifier 26, the output voltage may be —100.1 volts at 20% load and —100.5 volts at full load. The regulation curve therefore advantageously has a slightly rising characteristic which compensates for voltage drop in a line conductor connecting terminal 28 to the load. By inserting a 200 ohm line resistor 27, the voltage at terminal 28 will remain —100.0 volts from 20% to 100% load, yielding a flat regulation curve. Zener diode 34 may have any breakdown voltage less than 20 volts, as otherwise current would flow through rectifier 26 to output capacitor 30 instead of through the Zener diode.

The time period for the flow of current through diode 32 is a function of frequency and may be readily determined by considering energy equations. The energy per pulse is half the product of the inductance and the square of the initial current through diode 32. When the energy is multiplied by the frequency there results the power transferred to capacitor 40. The power supplied by capacitor 40 is in turn equal to the square of its voltage divided by the sum of resistors 42 and 44. Since the rate of change of current through diode 32 is equal to this voltage divided by the inductance, it may be shown that the transient period is proportional to the square root of the reciprocal of frequency and thus proportional to the square root of the period of oscillation. Since the frequency changes by a factor of five-to-one and the discharge period through diode 32 at 350 μsec., is 25 μsec., then at 150 μsec. the discharge period is $$\frac{25}{\sqrt{5}} = 11 \mu\text{sec.}$$

Referring now to FIGURE 3, the circuit is generally the same as that of FIGURE 1. However, in FIGURE 3 the negative terminal of 10 volt battery 2 is grounded rather than the positive terminal. Capacitor 16 of FIGURE 1 is replaced by a .016 μf capacitor 15 in FIGURE 3. Charging current for capacitor 15 is supplied by a 91.25K resistor 55 and an 8.75K resistor 57 which are serially connected across battery 2. The junction of resistors 55 and 57 is connected to the junction of capacitor 15, tertiary winding 8, and the cathode of the 1 volt forward drop silicon diode 18. Capacitor 40 of FIGURE 1 is replaced by a .08 μf capacitor 39 in FIGURE 3. Transistors 48 and 50 of FIGURE 1 are replaced by a single transistor 49 in FIGURE 3 having a current gain B of 40. Resistors 42 and 44 of FIGURE 1 are replaced respectively by a 9.6K resistor 41 and a 22.4K resistor 43. The junction of resistors 41 and 43 is connected to the base of a first n-p-n emitter follower transistor 52, the emitter of which is coupled to the base of a second n-p-n emitter follower transistor 54. The emitter of transistor 54 is connected to the anode of diode 18. The collectors of transistors 52 and 54 are grounded.

In operation of the circuit of FIGURE 3 and referring now to both FIGURES 3 and 4, slightly before zero μsec. transistor 4 is nonconductive. No voltage exists across any of the transformer windings, the voltage across capacitor 15 is negative, and the current from voltage dividing resistors 55 and 57 is charging capacitor 15 positively. At 0 μsec. the voltage across capacitor 15 becomes zero permitting a flow of the base current to transistor 4. Regenerative action between the collector winding 6 and the base winding 8 turns transistor 4 on. Assuming that full load is applied at terminal 28, the steady state voltage across capacitor 39 will be very small; and the base of transistor 52 will be substantially at ground potential. Accordingly the emitter of transistor 52 as well as the base and emitter of transistor 54 are substantially at ground potential. With transistor 4 turned on, 5 volts appear across winding 8. The initial base current flow through resistor 14 is again 10 ma.

This current flows through capacitor 15 causing a very rapid discharge to −1 volt where current through diode 18 from emitter follower 54 prevents any further negative excursion. Across resistor 14 appear now only 4 volts which produces a base current to transistor 4 of 8 ma. Between 0 μsec. and 100 μsec. the primary magnetizing current in winding 6 increases linearly from 0 to 100 ma. corresponding to a build-up in magnetizing current referred to the secondary from 0 to 20 ma. At 100 μsec. the total current through winding 6 constitutes the 100 ma. magnetizing current and 4 ma. transformer current which supports the 8 ma. load current in tertiary winding 8. Again, with a current gain of 13 for transistor 4 the 8 ma. base current will support only 104 ma. collector current; and at 100 μsec. an inductive kick occurs as transistor 4 is turned off. Between 100 and 150 μsec. the secondary voltage is substantially −100 volts; and the current through rectifier 26 to capacitor 30 decreases linearly from 20 ma. toward 0 ma. Slightly before 150 μsec., that is at 149 μsec., capacitor 30 is charged to −100 volts and −20 volts now appear across four-layer diode 32, causing breakdown. The secondary voltage immediately drops to zero and shortly thereafter the residual secondary current flowing now through tap 11 charges capacitor 36 to some small negative voltage equal to that across capacitor 39 whereupon the remaining current flows through transistor 49 to capacitor 39 at substantially constant voltage. Again the time period for the charging of capacitor 39 is approximately 11 μsec. since for FIGURE 3 the maximum frequency is 5 kilocycles as in FIGURE 1. At 160 μsec., all the magnetizing energy of the transformer having been exhausted, the voltage of all windings drops to zero. At 100 μsec., current from voltage dividing resistors 55 and 57 charges capacitor 15 exponentially from −1 volt toward +0.875 volt. At 200 μsec., the voltage across capacitor 15 reaches zero, turning on transistor 4 and beginning a new cycle. The time period between 0 and 200 μsec. represents the operation of the circuit for one complete cycle at full load; and again as in FIGURE 1 the maximum frequency is 5 kilocycles.

Assume now that the voltage across capacitor 39 is substantially −10 volts and that the load connected at terminal 28 is only 3/80 or 3.75% of rated load. With −10 volts across capacitor 39, the potential at the junction of voltage dividing resistors 41 and 43 and consequently at the bases and emitters of transistors 52 and 54 is −3 volts. The initial base current of 10 ma. flowing through resistor 14 charges capacitor 15 negatively to −4 volts where the base current of transistor 4 is reduced to 2 ma., most of which flows through emitter follower 54 and the 1 volt forward drop diode 18. With a current gain of 13 for transistor 4, 2 ma. base current will support 26 ma. collector current. Since 1 ma. collector current through winding 6 is required to support the 2 ma. base current through winding 8, a magnetizing current of 25 ma. may be supported. This corresponds to a magnetizing current referred to the secondary of 5 ma. Since the maximum magnetizing current is now reduced by a factor of four while the rate of change of magnetizing current due to the application of the 10 volts of battery 2 remains constant, the time interval until transistor 4 reaches saturation is one fourth of the original time period. Thus at 225 μsec. transistor 4 is no longer saturated and an inductive kick occurs. The secondary voltage jumps to −100 causing charging current to flow through rectifier 26 to storage capacitor 30 for an interval of 6.25 μsec. Between 225 μsec. and 231.25 μsec. the secondary magnetizing current decays linearly from 5 ma. to 2.5 ma. At 231.25 μsec. the voltage across capacitor 30 has built up to −100 volts and −20 volts appear at tap 11 across the winding portion 12 causing Shockley diode 32 to break down. The voltage of all windings immediately drops to zero. The 2.5 ma. secondary magnetizing current appears as a current of 12.5 ma. at tap 11 which flows through diode 32 rapidly charging capacitor 36 to −10 volts whereupon current flows through transistor 49 charging capacitor 39 at substantially constant voltage. Between 231.25 and 243.75 μsec., which represents a period of 12.5 μsec., the current flow to capacitor 39 decays linearly to zero. At 243.75 μsec. all the magnetizing energy of the transformer is exhausted, and the voltage of all windings drops to zero. Meanwhile, at 225 μsec. current from voltage dividing resistors 55 and 57 charges capacitor 15 exponentially from −4 volts toward +.875 volt. However, at 450 μsec. the voltage across capacitor 15 becomes zero, triggering transistor 4 into conduction and beginning a new cycle. The maximum period corresponds to the interval between 200 and 450 μsec. which represents 250 μsec. and a corresponding frequency of 4 kilocycles. It will be recalled in conjunction with FIGURE 1 that the period for current flow through diode 32 varies as the reciprocal of the square root of frequency or the square root of the cyclic period. In FIGURE 1 the minimum frequency is 1 kilocycle and the maximum period for charging capacitor 40, at 350 μsec., is 25 μsec. In FIGURE 3 the minimum frequency is 4 kilocycles and the maximum charging period for capacitor 39 at 237.5 μsec. is 12.5 μsec. Thus it will be seen that an increase in minimum frequency by a factor of four results in a reduction of the maximum charging period of either capacitor 39 or 40 by a factor of two. Between 450 and 475 μsec. the magnetizing current referred to the secondary changes linearly from 0 to 5 ma. while the magnetizing current of the primary winding increases linearly from 0 to 25 ma. Assume now that substantially no load is connected at 475 μsec. An inductive kick occurs as transistor 4 is turned off, the secondary voltage jumps to −100 producing −20 volts at tap 11, breaking down four-layer diode 32. The secondary voltage immediately drops to zero and the magnetizing current rapidly charges capacitor 36 to the same voltage as capacitor 39. Assuming that this voltage is slightly less than −10 volts, the current through transistor 49 charges capacitor 39 to −10 volts, whereupon Zener diode 34 breaks down. Between 475 and 500 μsec. substantially the entire magnetizing energy is dissipated in Zener diode 34 at a level of −10 volts corresponding to −50 volts across secondary winding 10.

It will be seen that at full load the frequency is high, 5 kilocycles; and most of the energy of each pulse is coupled to capacitor 30 while very little is directed to capacitor 39 which is subsequently dissipated in resistors 41 and 43. At 3.75% load the frequency of pulses is reduced by a factor of 20% to 4 kilocycles; and the energy of each pulse is reduced by a factor of $4^2=16$. Thus the power output is reduced to 5% of that at rated load. Of this 5% power output, 3.75% is coupled to capacitor 30 where it is subsequently dissipated by the load; and 1.25% is coupled to capacitor 39 where it is subsequently dissipated by resistors 41 and 43. At no load the power output remains constant at 5%. Of this, 1.25% is still dissipated in resistors 41 and 43, and the remaining 3.75% is now dissipated by the Zener diode 34.

Turning now to the timing circuitry, it will be noted that the Thevenin equivalent voltage provided by resistors 55 and 57 is +0.875 and the Thevenin equivalent resistance of resistors 55 and 57 in parallel is 8K. At no load the initial voltage across this Thevenin 8K equivalent resistance at 100 μsec. is 1.875 volts while at 200 μsec. the voltage is 0.875 volt. Thus $$\frac{.875}{1.875} = .46 = e^{-.76}$$

This means that 100 μsec. represents .76 of the time constant of the Thevenin equivalent resistance and capacitor 15. At loads of 3.75% or less the initial voltage across the equivalent Thevenin resistance at 225 μsec. is 4.875 volts while at 450 μsec. the voltage is .875 volt. Thus $$\frac{0.875}{4.875} = .18 = e^{-1.7}$$

This means that 450−225=2.25 μsec. represents 1.7 times the time constant of the Thevenin equivalent resistance and capacitor 15. It will be further noted that $$\frac{1.7}{.76} = 2.25$$

which corresponds to the fact that 225 microseconds is two and one-quarter times as long as 100 microseconds. The time constant of the equivalent Thevenin resistance of resistors 55 and 57 and capacitor 14 is therefore $$\frac{100}{.76} = \frac{225}{1.7} = 132 \text{ μsec.}$$

Thus capacitor 15 should have a value of .0165 μf. When transistor 4 is triggered on the rate of change of voltage across capacitor 14 is very large so that these charging transients have been shown as vertical lines in FIGURE 4 at 0 μsec., 200 μsec., and 450 μsec. It is desirable that the equivalent Thevenin resistance of resistors 55 and 57 be sufficiently large that with 4 volts across capacitor 15, the current flow through the equivalent Thevenin resistance is appreciably less than 2 ma. so that considerable residual current is supplied through transistors 52 and 54 and diode 18. With 4 volts across capacitor 15 and a Thevenin equivalent voltage of .875 volt, the total voltage applied to the equivalent 8K Thevenin resistance is 4.875 volts; and consequently the current is 0.6 ma. This means then that through diode 18 flows 1.4 ma. to provide the 2 ma. base current to transistor 4. The minimum value of Thevenin resistance is 2.44K. For such value, the current flow through the Thevenin resistance would be 2 ma.; and substantially no current would be supplied through diode 18.

Again the resistance value of resistor 38 should be negligible compared with the back resistance of the emitter-base junction of transistor 49 so that leakage current through such backwardly biased emitter-base junction does not disturb the return of the anode of four-layer diode 32 to ground potential. If the back resistance of the emitter-base junction of transistor 49 is not sufficiently high then a conventional blocking diode may be inserted with its anode connected to the emitter of transistor 50.

In steady state operation with a 3.75% load so that the voltage across capacitor 39 is −10 volts, the current pulses to capacitor 39 decrease linearly from 12.5 ma. to 0 ma. in 12.5 μsec., which represents an average current of 6.25 ma. for the period and a consequent charge of .078 microcoulomb. Since the frequency is 4 kilocycles this represents a current of .31 ma. This average current of the pulses flowing out of capacitor 39 through transistor 49 must equal the average current flowing into capacitor 39 through resistors 41 and 43. Accordingly the equivalent resistance of resistors 41 and 43 in series should have a value of 32K.

Again it is desired that the voltage across capacitor 39 should vary perhaps not more than 10% per cycle. Thus for a 3.75% load, capacitor 39 will be rapidly charged from −9 to −10 volts and then decay slowly from −10 to −9 volts where another charging period is initiated. In order that .078 microcoulomb produce a change of only 1 volt, capacitor 39 should have a value of .08 μf.

Again FIGURE 4 does not truly represent a curve of actual operation, but only a curve representing steady state operation since the voltage across capacitor 39 could not in one cycle jump from substantially 0 volt, as indicated at 100 μsec., to −10 volts as indicated at 225 μsec. Capacitor 39 introduces sufficient smoothing to prevent extreme oscillation in the power output of the oscillator so that the design improvement in efficiency by a factor of twenty over circuits of the prior art is achieved.

Transistors 46 and 49 limit the charging current to capacitor 39 to a value proportional to the discharge current through resistors 41 and 43 in order to avoid a large overshoot upon a sudden reduction in load where a large residual amount of inductive energy must be dissipated. With a 3.75% load at terminal 28 the initial current through diode 32 to capacitor 39 is 12.5 ma.; and with −10 volts across capacitor 39 the emitter current of transistor 46 is against .31 ma. With breakdown of four-layer diode 32, followed by the rapid charging of capacitor 36 to a potential equal to that across capacitor 39 so that the emitter of transistor 49 is slightly negative relative to its collector, the emitter current of transistor 46, rather than flowing through the base thereof to capacitor 39, flows instead through the collector thereof to the base of transistor 49. This produces a collector current in transistor 49 of .31×40=12.5 ma. It will be appreciated that if the voltage across capacitor 39 is −1 volt instead of −10 volts, the charging current to capacitor 39 through transistor 49 will be correspondingly limited to 1.25 ma. Thus even if at the instant of breakdown of diode 32 the current therethrough is 25 or even 100 ma., the current through capacitor 39 will still be limited to 1.25 ma. The voltage at the emitter of transistor 49 will decrease to −10 volts where the excess current is passed by breakdown of Zener diode 34. Again transistor 46 operates as a constant current source so that the base current of transistor 49 is proportional to the voltage across capacitor 39 irrespective of the voltage drop across transistors 46 and 49.

The inductance value of winding portion 12 and the values of capacitor 36 and resistor 38 should be so related that the inductive energy is exhausted before the subsequent gating "on" of transistor 4 and the capacitive energy is exhausted before the subsequent breakdown of diode 32. This LCR circuit should therefore be less than critically damped so that, neglecting for the moment diode 32, the transient would be oscillatory. However when the inductive current decreases to zero, diode 32 reverts to its high impedance state; and there follows merely a simple R-C exponential discharge, since the inductance has been decoupled. In order to suppress parasitic oscillations which may occur due to the inherent leakage inductance of the secondary winding it may be desirable to insert some small resistance of the order of magnitude of 20 ohms in series with four-layer diode 32.

It will be seen then that the circuit of FIGURE 3 is to be preferred. Since the minimum frequency is 4 kilocycles, which is four times that of the minimum frequency of 1 kilocycle of FIGURE 1, a smoothing capacitor 39 may have a value of one-fourth that of smoothing capacitor 40 of FIGURE 1 with the result that the rate of response of the circuit to changes in load is increased by a factor of four. Furthermore, the control of the mark or on time of transistor 4 produces an energy for each pulse which varies as the square of such on time. Thus in FIGURE 3 the reduction in on time of transistor 4 by a factor of four reduces the energy of each pulse by a factor of sixteen. While the minimum power output of the circuit of FIGURE 1 is 20% of rated output, the minimum power output of the circuit of FIGURE 3 is only 5% of rated output.

The regulation from 100% to 5% load is excellent. Thus for 95 ohms forward resistance of rectifier 26, the output voltage may be −100.01 volts at 5% load and −100.25 volts at full load. Again the regulation curve has a rising characteristic. By inserting a 100 ohm line resistor 27, the voltage at terminal 28 will remain −100.0 volts from 5% to 100% load, yielding a flat regulation curve. It will be noted that in FIGURE 1 at 20% load the current through rectifier 26 prior to breakdown of diode 32 is 5 ma. while in FIGURE 3 at 5% load the current through rectifier 26 prior to breakdown of diode 32 is only 2.5 ma. For both FIGURES 1 and 3 at 100% load very little current flows through rectifier 26 prior to breakdown of diode 32. Thus in FIGURE 1 an 80 ohm forward resistance of rectifier 26 produces a variation in output voltage from 20% to 100% load of 0.4 volt, while in FIGURE 3 a 95 ohm forward resistance of rectifier 26 produces a variation in output voltage from 5% to 100% load of only .24 volt. In FIGURE 1 line resistor 27 should have a value of 200 ohms while in FIGURE 3 resistor 27 need have a value of only 100 ohms.

If desired in FIGURE 1 transistors 48 and 50 may be replaced by a single transistor, as transistor 49 of FIGURE 3, which transistor should have a stable current gain of 80. Furthermore, in FIGURE 1 the equivalent impedance of voltage dividing resistors 42 and 44 is sufficiently low that the junction of such resistors may be directly coupled to resistor 56; and transistor 53 may be eliminated. In such event the resistance value of resistor 56 should be reduced somewhat to account for the equivalent resistance of resistors 42 and 44 in parallel. In FIGURE 3 the equivalent resistance of resistors 41 and 43 is sufficiently low that one of transistors 52 and 54 may be eliminated, provided that the current gain of the remaining single-stage emitter follower is reasonably high.

It will be seen that I have accomplished the objects of my invention. My relaxation power supply has a high efficiency. At no load the circuit of FIGURE 1 dissipates only 20% of rated output while the circuit of FIGURE 3 dissipates only 5% of rated output. For loads greater than 20% and 5%, respectively, both circuits have an efficiency approaching 100%. This high efficiency is achieved by controlling the mark-space ratio of the relaxation oscillator. My relaxation power supply has substantially perfect regulation. In my power supply the quantity regulated is not the direct current output itself but instead the energy of the output pulses. Furthermore I control not only the energy of each individual pulse but also the portions of the energy of a single pulse which are either supplied to the load or diverted from the load to the control circuit.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A power supply including in combination a source of inductive energy pulses, a capacitor, means including a unilateral impedance for coupling an energy pulse to the capacitor, a device having the characteristic of breaking down from a high impedance state to a low impedance state at a certain voltage, means including said voltage-responsive two-state device for diverting a portion of an energy pulse from being coupled through the unilateral impedance, and means responsive to the diverted portion of an energy pulse for controlling the power output of the source.

2. A power supply as in claim 1 in which the source comprises a relaxation oscillator.

3. A power supply as in claim 1 in which the source comprises a blocking oscillator.

4. A power supply including in combination an inductor, a relaxation oscillator including the inductor, a capacitor, means including a unilateral impedance for coupling the inductor to the capacitor, the relaxation oscillator having a certain maximum ratio of ON time to OFF time, a control circuit, a device having the characteristic of breaking down at a certain voltage from a high impedance state to a low impedance state, means exclusive of the unilateral impedance and including the device for coupling the inductor to the control circuit, and means responsive to the control circuit for decreasing the ratio of ON time to OFF time of the relaxation oscillator.

5. A power supply as in claim 4 in which the control circuit increases the OFF time.

6. A power supply as in claim 4 in which the control circuit reduces the ON time.

7. A power supply as in claim 4 in which the control circuit both increases the OFF time and reduces the ON time.

8. A power supply including in combination an inductor, a relaxation oscillator including the inductor, the relaxation oscillator having a certain mark-space ratio, a capacitor, means including a unilateral impedance for coupling the inductor to the capacitor, a device having the characteristic of breaking down from a high impedance state to a low impedance state at a certain voltage, a control circuit, means exclusive of the unilateral impedance and including the device for coupling the inductor to the control circuit, and means responsive to the control circuit for varying the mark-space ratio of the relaxation oscillator.

9. A power supply as in claim 8 in which the control circuit comprises a voltage limiting device.

10. A power supply as in claim 8 in which the control circuit comprises a current limiting device.

11. A power supply as in claim 8 in which the control circuit comprises both a voltage limiting device and a current limiting device.

12. A power supply as in claim 8 in which the unilateral impedance has a certain forward resistance, the supply further including an output terminal and means including a resistor having a resistance value of predetermined relationship to said forward resistance for coupling the capacitor to the output terminal.

13. A power supply including in combination a source of inductive energy pulses, a circuit comprising a resistor, a capacitor, means including a device having the characteristic of breaking down at a certain voltage from a high impedance state to a low impedance state for coupling the source to the circuit, and means including a unilateral impedance for coupling the circuit to the capacitor.

14. A power supply as in claim 13 in which the circuit comprises a capacitor shunting the resistor.

15. A power supply as in claim 13 in which the circuit comprises a voltage limiting device shunting the resistor.

16. A power supply as in claim 13 in which the unilateral impedance has a current limiting forward characteristic.

17. A power supply as in claim 13 in which the unilateral impedance is a constant current device, the supply further including means responsive to the capacitor voltage for controlling the constant current device.

18. A control circuit including in combination an alternating-current source, a capacitor, a resistor, a first and a second transistor of opposite types, means coupling the source to the emitter of the first transistor, means coupling the collector of the first transistor to one plate of the capacitor and to the base of the second transistor, means connecting the resistor between the emitter of the second transistor and the other plate of the capacitor, and means coupling the collector of the second transistor to the base of the first transistor.

19. A power supply including in combination a source of an inductive energy pulse of a certain duration, a capacitor, a rectifier, a device having the characteristic of breaking down from a high impedance state to a low impedance state at a certain voltage, means including the rectifier for coupling an initial portion of the energy pulse to the capacitor, and means including the device for preventing a terminal portion of the energy pulse from being coupled through the rectifier.

20. A blocking oscillator including a combination a transformer having a first and a second winding, a transistor having a base and an emitter and a collector, a capacitor, means connecting the first winding to the collector, means connecting the second winding and the capacitor in series between the base and the emitter, the oscillator being free-running and having a certain ON time and a certain OFF time, means for providing a continuous charging current to the capacitor during the OFF time, and means for limiting the capacitor discharge voltage during the ON time.

21. A blocking oscillator as in claim 20 which further includes a source of a variable control signal and means responsive to the control signal for varying the capacitor charging current.

22. A blocking oscillator as in claim 20 which further includes a source of a variable control signal and means responsive to the control signal for varying the capacitor discharge voltage limit.

References Cited by the Examiner

UNITED STATES PATENTS

| | | | |
|---|---|---|---|
| 2,848,614 | 8/1958 | Lyons | 331—113 |
| 2,854,615 | 9/1958 | Light | 331—112 |
| 2,895,081 | 7/1959 | Crownover et al. | 331—112 |
| 2,950,446 | 8/1960 | Humez et al. | 331—113 |
| 2,959,745 | 11/1960 | Grieg | 331—113 |
| 3,016,468 | 1/1962 | Moraff | 307—88.5 |
| 3,079,525 | 2/1963 | Tap | 331—111 |
| 3,121,803 | 2/1964 | Watters | 331—112 |

ROY LAKE, *Primary Examiner.*

S. H. GRIMM, *Assistant Examiner.*